(12) United States Patent
Katzourakis et al.

(10) Patent No.: US 11,845,453 B1
(45) Date of Patent: Dec. 19, 2023

(54) REDUNDANT ACTUATOR SYSTEM

(71) Applicants: Diomidis Katzourakis, Chania (GR); Huibert Mees, Pleasanton, CA (US); Robert M. Cammarata, Shelby Township, MI (US); Bo Guo, Sunnyvale, CA (US)

(72) Inventors: Diomidis Katzourakis, Chania (GR); Huibert Mees, Pleasanton, CA (US); Robert M. Cammarata, Shelby Township, MI (US); Bo Guo, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 211 days.

(21) Appl. No.: 17/308,089

(22) Filed: May 5, 2021

Related U.S. Application Data (63) Continuation of application No. 15/666,799, filed on Aug. 2, 2017, now Pat. No. 11,046,330.
(Continued)

(51) Int. Cl.
*B60W 50/029* (2012.01)
*B60W 10/22* (2006.01)
(Continued)

(52) U.S. Cl.
CPC ....... *B60W 50/029* (2013.01); *B60G 17/0185* (2013.01); *B60T 17/221* (2013.01); *B60W 10/04* (2013.01); *B60W 10/18* (2013.01); *B60W 10/20* (2013.01); *B60W 10/22* (2013.01); *B60W 50/0205* (2013.01); *B62D 5/0484* (2013.01); *B60T 2270/413* (2013.01); *B60W 2050/021* (2013.01); *B60W 2050/022* (2013.01); *B60W 2050/0292* (2013.01); *B60W 2050/0295* (2013.01)

(58) Field of Classification Search
CPC ............... B60G 17/0185; B60T 17/221; B60T 2270/413; B60W 10/04; B60W 10/18; B60W 10/20; B60W 10/22; B60W 2050/021; B60W 2050/022; B60W 2050/0292; B60W 2050/0295; B60W 50/0205; B60W 50/029
See application file for complete search history.

(56) References Cited

U.S. PATENT DOCUMENTS

| | | | |
|---|---|---|---|
| 3,500,725 A | 3/1970 | Haddock, Jr. |
| 6,345,225 B1 | 2/2002 | Bohm et al. |

(Continued)

*Primary Examiner* — Charles J Han
(74) *Attorney, Agent, or Firm* — Young Basile Hanlon & MacFarlane, P.C.

(57) ABSTRACT

An actuator system includes an actuator, a first actuator controller that is operable to control operation of the actuator and is operable to determine a first value for a parameter that relates to operation of the actuator, a second actuator controller that is operable to control operation of the actuator and is operable to determine a second value for the parameter, and at least one additional component that is operable to determine a third value for the parameter. A fault is identified in response to determining that the first value does not agree with at least one of the second value or the third value. In response to identification of the fault, the first actuator controller changes from an activated state to a deactivated state and the second actuator controller changes from a deactivated state an activated state.

20 Claims, 6 Drawing Sheets

Related U.S. Application Data

(60) Provisional application No. 62/394,365, filed on Sep. 14, 2016.

(51) Int. Cl.
| | | |
|---|---|---|
| *B60W 10/18* | (2012.01) | |
| *B60W 10/04* | (2006.01) | |
| *B60W 10/20* | (2006.01) | |
| *B60W 50/02* | (2012.01) | |
| *B62D 5/04* | (2006.01) | |
| *B60T 17/22* | (2006.01) | |
| *B60G 17/0185* | (2006.01) | |

(56) References Cited

U.S. PATENT DOCUMENTS

| | | |
|---|---|---|
| 6,390,571 B1 | 5/2002 | Murphy |
| 6,513,885 B1 | 2/2003 | Salamat et al. |
| 7,393,065 B2 | 7/2008 | Craig et al. |
| 2006/0015231 A1* | 1/2006 | Yoshimura ............ B60L 3/0076 701/1 |
| 2008/0296106 A1 | 12/2008 | Nilsson |

* cited by examiner

REDUNDANT ACTUATOR SYSTEM

CROSS-REFERENCE TO RELATED APPLICATIONS

This application is a continuation of U.S. patent application Ser. No. 15/666,799, filed on Aug. 2, 2017, which claims the benefit of U.S. Provisional Application No. 62/394,365, filed on Sep. 14, 2016, the contents of which are incorporated herein by reference in its entirety.

TECHNICAL FIELD

The application relates generally to actuator systems.

BACKGROUND

Actuators are controllable systems that cause or affect motion of a structure. Proper functioning of the actuator systems allows for proper control of the structure. A failure of one or more of these actuator systems may render the structure uncontrollable, and thus, unable to continue operating.

SUMMARY

One aspect of the disclosure is vehicle actuator system that includes an actuator, a first actuator controller that is operable to control operation of the actuator and is operable to determine a first value for a parameter that relates to operation of the actuator, a second actuator controller that is operable to control operation of the actuator and is operable to determine a second value for the parameter, and at least one additional component that is operable to determine a third value for the parameter. A fault is identified in response to determining that the first value does not agree with at least one of the second value or the third value. The first actuator controller changes from an activated state in which the first actuator controller is responsible for control of the actuator to a deactivated state in which the first actuator controller is not responsible for control of the actuator in response to identification of the fault. The second actuator controller changes from a deactivated state in which the second actuator controller is not responsible for control of the actuator to an activated state in which the second actuator controller is responsible for control of the actuator in response to identification of the fault.

Another aspect of the disclosure is a vehicle actuator system that includes an actuator, a first actuator controller that is operable to control operation of the actuator based on a desired value for a parameter, a second actuator controller that is operable to control operation of the actuator, and one or more sensors that are operable to determine an actual value that corresponds to the parameter, wherein a fault is identified in response to determining that the actual value does not agree with the desired value. The first actuator controller is switched from an activated state in which the first actuator controller is responsible for control of the actuator to a deactivated state in which the first actuator controller is not responsible for control of the actuator in response to identification of the fault. The second actuator controller is switched from a deactivated state in which the second actuator controller is not responsible for control of the actuator to an activated state in which the second actuator controller is responsible for control of the actuator in response to identification of the fault.

Another aspect of the disclosure is a vehicle actuator control method. The method includes controlling operation of an actuator using a first component, determining a first value for a parameter that relates to operation of the actuator using the first component, determining a second value for the parameter using a second component, and determining a third value for the parameter using a third component. The method also includes determining that the first value does not agree with at least one of the second value or the third value. In response to determining that the first value does not agree with at least one of the second value or the third value, the method includes determining that a fault is present. In response to determining that the fault is present, the method includes deactivating the first component and activating the second component, such that the actuator is controlled using the second component.

Another aspect of the disclosure is a vehicle actuator control method. The method includes controlling an actuator based on a desired value using a first actuator controller, obtaining an actual value from one or more sensors, determining that a fault is present based on the actual value and the desired value. In response to determining that the fault is present, the method includes deactivating the first actuator controller and activating a second actuator controller, such that the actuator is controlled based on the desired value using the second actuator controller.

DETAILED DESCRIPTION

Vehicle actuators may include hardware components and software components. Hardware components may include, as examples, a motor, a pump, a piston, or a sensor. Software components may regulate operation of the hardware components based on information received from sensors and/or information received from other vehicle actuators and/or other vehicle systems. In some scenarios, failure of a hardware or software component of a vehicle actuator system may not be readily detectable. In other scenarios, failure of a hardware or software component of a vehicle actuator system may leave the vehicle inoperable.

The systems and methods described herein function to detect hardware and/or software component failures. In some embodiments, redundancies are provided to allow continued operation of the vehicle after a failure.

Figure 1:
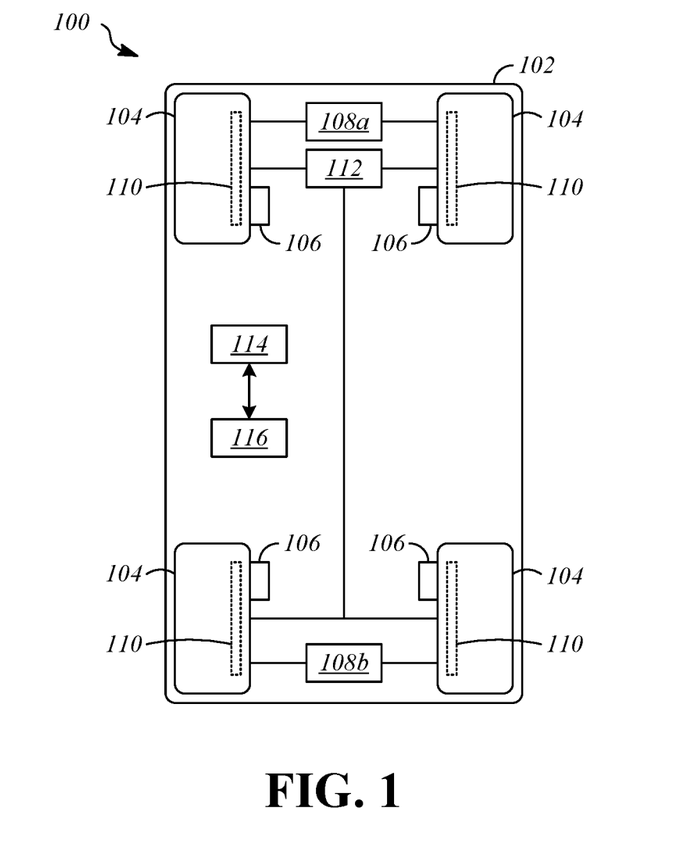
FIG. 1 is an illustration showing a vehicle.

FIG. 1 shows a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes road wheels 104. Four of the road wheels 104 are included in the illustrated example, but other implementations are possible. The road wheels 104 are the portion of the vehicle 100 that contacts the surface on which the vehicle 100 is travelling, and the characteristics of the road wheels 104 are responsible, in part, for the amount of friction available. The road wheels 104 may include tires, such as conventional pneumatic tires formed in part from synthetic rubber, or other friction-enhancing structures may be incorporated in the road wheels 104.

The vehicle 100 includes suspension components 106. The suspension components 106 typically include numerous individual components, many of which are associated with one or more of the road wheels 104. The suspension components 106 may include components that are operable to control characteristics of the motion of the road wheels 104 relative to the vehicle body 102, such as shocks, struts, springs, and sway bars. The suspension components 106 may include either or both of non-adjustable passive components or adjustable active components that allow modification of suspension characteristics during operation of the vehicle 100. The suspension components 106 may include sensors that output signals indicative of the states and operating characteristics of some or all of the suspension components 106 at a given time. The suspension components 106 may also include actuators that are able to cause modification of characteristics of the components of the suspension components 106 in response to control signals.

The vehicle 100 includes steering components, which may include front steering components 108a and rear steering components 108b. The steering components 108a, 108b are operable to modify a steering angle of some or all of the road wheels 104 relative to the vehicle body 102. As one example, the steering components 108a, 108b may be or include a conventional rack and pinion arrangement. In some implementations, the steering components 108a, 108b are operable to control the steering angles of the road wheels 104 independently. The steering components 108a, 108b may include one or more sensors to output signals indicative of the steering angles of the road wheels 104. The steering components 108, 108b may include actuators operable to cause adjustment of the steering angles of the road wheels 104 in response to control signals.

The vehicle 100 includes braking components 110. The braking components 110 include components that are operable to slow the speeds of the road wheels 104, such as conventional disk brakes. Other types of components may be utilized to slow the speeds of the road wheels 104. The braking components 110 also include components that cause and control application of braking forces. These components may include, as examples, a brake control module, a master cylinder, and a brake booster. The braking components 110 are operable to apply braking to each of the road wheels 104 individually. The braking components 110 include sensors that output signals that are indicative of the current operating characteristics of the braking components 110. The braking components 110 may also include actuators that are operable to cause and control application of braking forces in response to control signals.

The vehicle 100 includes propulsion components 112, which may also be referred to as a powertrain. The propulsion components 112 include a prime mover that is operable to convert stored energy into driving force, and components that are operable to supply this force to some or all of the road wheels 104 in order to propel the vehicle 100. As one example, the propulsion components 112 may include an internal combustion engine that burns liquid fuel. As another example, the propulsion components 112 may include an electric motor that utilizes electrical energy that is stored in batteries or supplied by a generator.

The vehicle 100 includes an electronic control unit 114. Although the electronic control unit 114 is shown as a single device, the same functions may be implemented using multiple devices, such as individual electronic control units associated with each of the various components of the vehicle 100. The electronic control unit 114 may be in electrical communication with components including the suspension components 106, the steering components 108a, 108b, the braking components 110, and the propulsion components 112 to transmit commands to the components and/or to receive information from the components. The electronic control unit 114 may include a memory and a processor that is operable to execute instructions that are stored in the memory in order to perform operations as will be described herein.

The vehicle 100 also includes sensors 116 that are in communication with the electronic control unit 114. The sensors 116 monitor and report information regarding operating characteristics of the vehicle 100. Some of the sensors 116 may be incorporated in the suspension components 106, the steering components 108a, 108b, the braking components 110, and the propulsion components 112.

Figure 2:
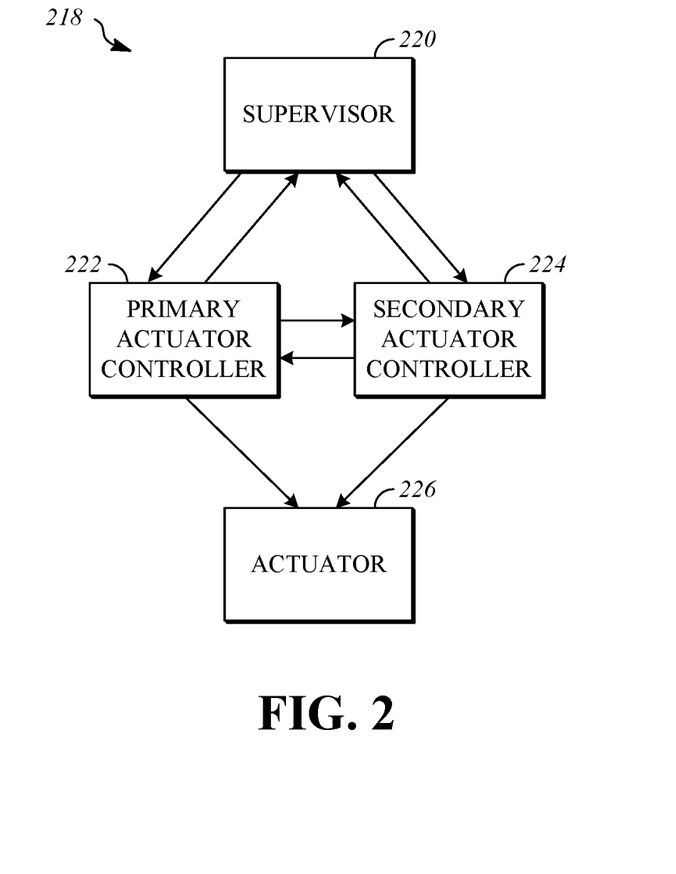
FIG. 2 is an illustration showing a vehicle actuator system.

FIG. 2 is an illustration showing a vehicle actuator system 218. The vehicle actuator system 218 includes a supervisor 220, a primary actuator controller 222, a secondary actuator controller 224, and an actuator 226. The vehicle actuator system 218 may be incorporated in the vehicle 100 for controlling, for example, the suspension components 106, the steering components 108a, 108b, the braking components 110, or the propulsion components 112.

The supervisor 220 is responsible for coordinating operation of various actuator systems and components of the vehicle 100. The supervisor 220 may be implemented as part of the electronic control unit 114 of the vehicle 100 or may be implemented as a separate computing device. The supervisor 220 may receive information based on control inputs from a human driver or based on control commands from an autonomous control system. As an example, control inputs from an autonomous control system may include information that describes a desired trajectory and a desired velocity profile. The supervisor 220 may also receive information describing the environment around the vehicle 100 and/or information describing operating state of the various system and components of the vehicle 100, such as from the sensors 116.

Based on the control inputs, the supervisor 220 may determine desired states for the actuator 226 and, optionally, additional actuators that are regulated by the supervisor 220. The desired states are intended to cause the vehicle 100 to move in a manner that is consistent with the control inputs or control commands. In some implementations, the desired states determined by the supervisor 220 may deviate from the intention of control inputs or control commands, as examples, to avoid a loss of stability, to regain stability, or to avoid violating a constraint such as a minimum distance from an obstacle. To cause operation of the vehicle 100 according to these desired states, supervisor 220 transmits commands to the various actuators. The command may be, for example, in the form of a request for a specific action. As an example, a request for braking may specify a desired braking force, a desired deceleration rate, or a desired fluid pressure to be supplied to the pistons of the brakes.

The primary actuator controller 222 and the secondary actuator controller 224 are similar components that are each configured to control operation of the actuator 226. The primary actuator controller 222 and the secondary actuator controller 224 may be connected in parallel between the supervisor 220 and the actuator 226. Thus, the primary actuator controller 222 and the secondary actuator controller 224 may each send information to and receive information (including commands) from the supervisor 220. Similarly, the primary actuator controller 222 and the secondary actuator controller 224 may each send information (including commands) to and receive information from the actuator 226. The primary actuator controller 222 and the secondary actuator controller 224 are also connected to one another such that each is able to send information to and receive information from the other.

In some embodiments, only one of the primary actuator controller 222 or the secondary actuator controller 224 are able to exercise control over the actuator 226 at a given time. Control of the actuator 226 may be transferred between the primary actuator controller 222 and the secondary actuator controller 224. For example, control of the actuator 226 may be transferred in response to detecting a fault or failure of one of the primary actuator controller 222 or the secondary actuator controller 224.

Each of the supervisor 220, the primary actuator controller 222, and the secondary actuator controller 224 are configured to calculate values for one or more parameters that relate to operation of the actuator 226. The parameters include, as examples, commands for controlling operation of the actuator 226 or status information describing operation of the actuator 226. Commands for controlling the actuator 226 may be in the form of signals or data that may be transmitted from the primary actuator controller 222 and/or the secondary actuator controller 224 to electrical control components that are incorporated in the actuator 226.

In some embodiments, two or more components such as the supervisor 220, the primary actuator controller 222, and the secondary actuator controller 224 may each calculate a value for the same parameter using a different algorithm, such as a first algorithm utilized by the supervisor 220, a second algorithm utilized by the primary actuator controller 222, and a third algorithm utilized by the secondary actuator controller 224. The different algorithms may use a common set of input values, such as values received from sensors, or the different algorithms may use different input values. In these embodiments, if the values calculated by the supervisor 220, the primary actuator controller 222, and the secondary actuator controller 224 disagree (e.g. differ by more than a threshold value), the disagreement may be indicative of one or more of a hardware fault, a software fault, or a sensor fault, as will be described further herein.

In some embodiments, two or more components such as the supervisor 220, the primary actuator controller 222, and the secondary actuator controller 224 may each calculate a value for the same parameter using the same algorithm. The same set of inputs may be utilized for calculating the value for the parameter by the primary actuator controller 222 and the secondary actuator controller 224. In some embodiments, the hardware components that perform the calculations (e.g., a microprocessor or an application-specific integrated circuit) may be different for each of the supervisor 220, the primary actuator controller 222, and the secondary actuator controller 224. In these embodiments, if the values calculated by the supervisor 220, the primary actuator controller 222, and the secondary actuator controller 224 disagree (e.g. differ by more than a threshold value), the disagreement may be indicative of a hardware fault or an incompatibility between the hardware and the algorithm.

Figure 3:
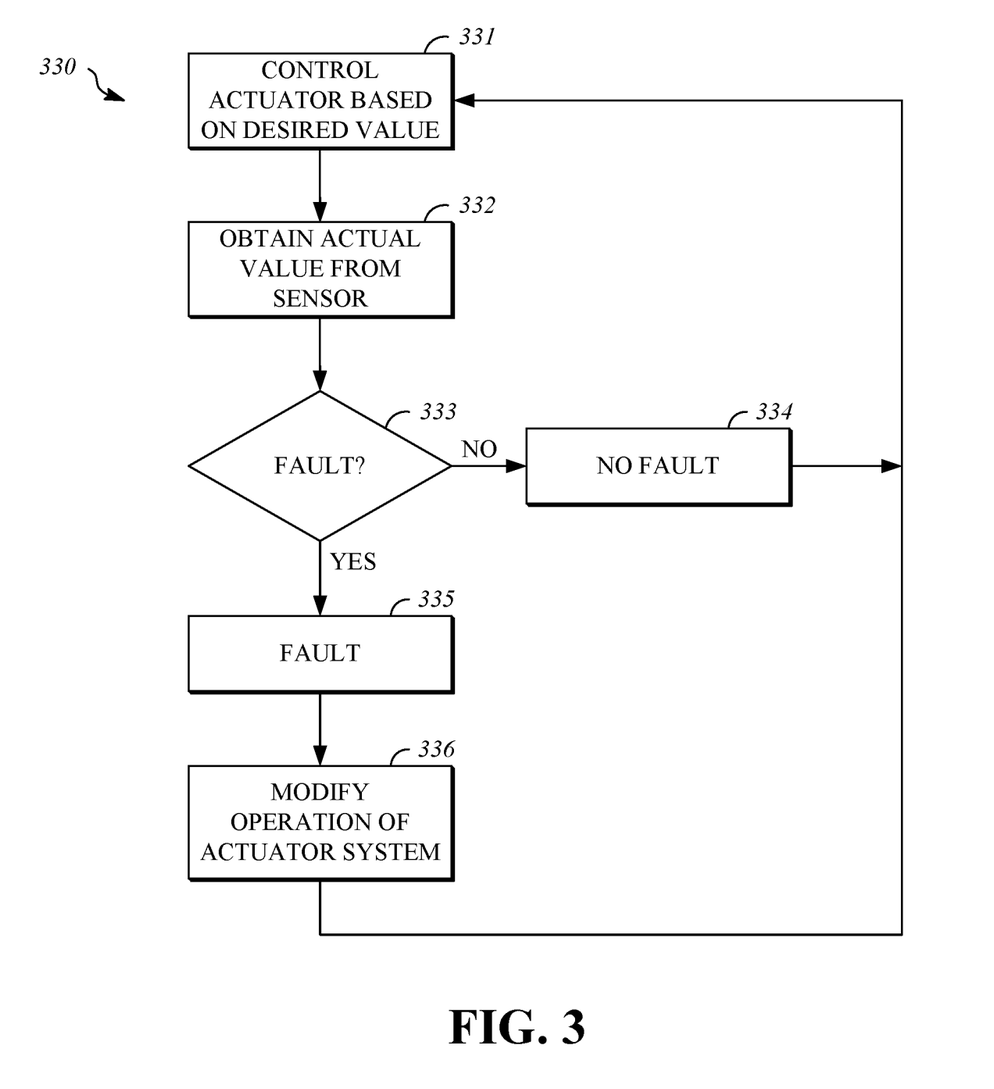
FIG. 3 is a flowchart showing an actuator control process according to a first example.

FIG. 3 is a flowchart that shows an actuator control process 330 according to a second example. The actuator control process 330 may be implemented using the vehicle actuator system 218. As an example, the actuator control process 330 may be implemented in part by software executed by some or all of the components of the vehicle actuator system 218.

In operation 331, an actuator is controlled based on a desired value. Operation 331 may be performed, for example, by the primary actuator controller 222 to control operation of the actuator 226. The primary actuator controller 222 may determine the desired value based on control inputs or commands received from the supervisor 220. The desired value may also be determined based on information that is collected by sensors, such as the sensors 116 of the vehicle 100. The primary actuator controller 222 causes operation of the actuator 226 in order to achieve the desired value, such as by sending a command to the actuator 226. As examples, the desired value may be a steering angle or a braking force.

In operation 332, an actual value is obtained from one or more sensors, such as from the sensors 116 of the vehicle 100. The actual value represents an operating characteristic of the actuator that was controlled in operation 331. The actual value may directly correspond to the desired value from operation 331, or the actual value may be an indirect measurement that is related to the desired value from operation 331. As an example, if the desired value from operation 331 is a steering angle, it may be directly measured by the sensors 116 by measuring the angle of one or more of the road wheels 104, or it may be indirectly measured by the sensors 116 by measuring a lateral acceleration value.

In operation 333, a determination is made as to whether a fault is present based on the desired value from operation 331 and the actual value from operation 332. In some embodiments, where the actual value is a direct measurement, operation 333 may include determining whether the actual value differs from the desired value by more than a threshold value. In some embodiments, one or both of the direct measurement and the actual value may be converted to a different form in order to allow comparison of the two values, or another comparison method be utilized, such as a lookup table that specifies acceptable ranges for the actual value based on the desired value. If the determination in operation 333 indicates that the actual value is consistent with the desired value, it is determined that no fault is present at operation 334 and the process then returns to operation 331. If the determination at operation 334 indicates that the actual value is not consistent with the desired value, it is determined that a fault is present at operation 335 and the process continues to operation 336.

At operation 336, control of the actuator 226 may be modified in response to the determination, at operation 335, that a fault may be present. As an example, the responsibility for control of the actuator 226 may be changed from a first actuator controller that is currently responsible for controlling operation of the actuator 226, such as the primary actuator controller 222, to a second actuator controller, such as the secondary actuator controller 224. This determination may be made by any involved component, such as the supervisor 220, the primary actuator controller 222, or the secondary actuator controller 224. Thus, the primary actuator controller 222 and the secondary actuator controller 224 may switch between activated and deactivated states base on a self-determination regarding modification of control or in response to a command from another component.

Subsequent to modification of operation of the actuator 226 at operation 336, the process may return to operation 331.

Figure 4:
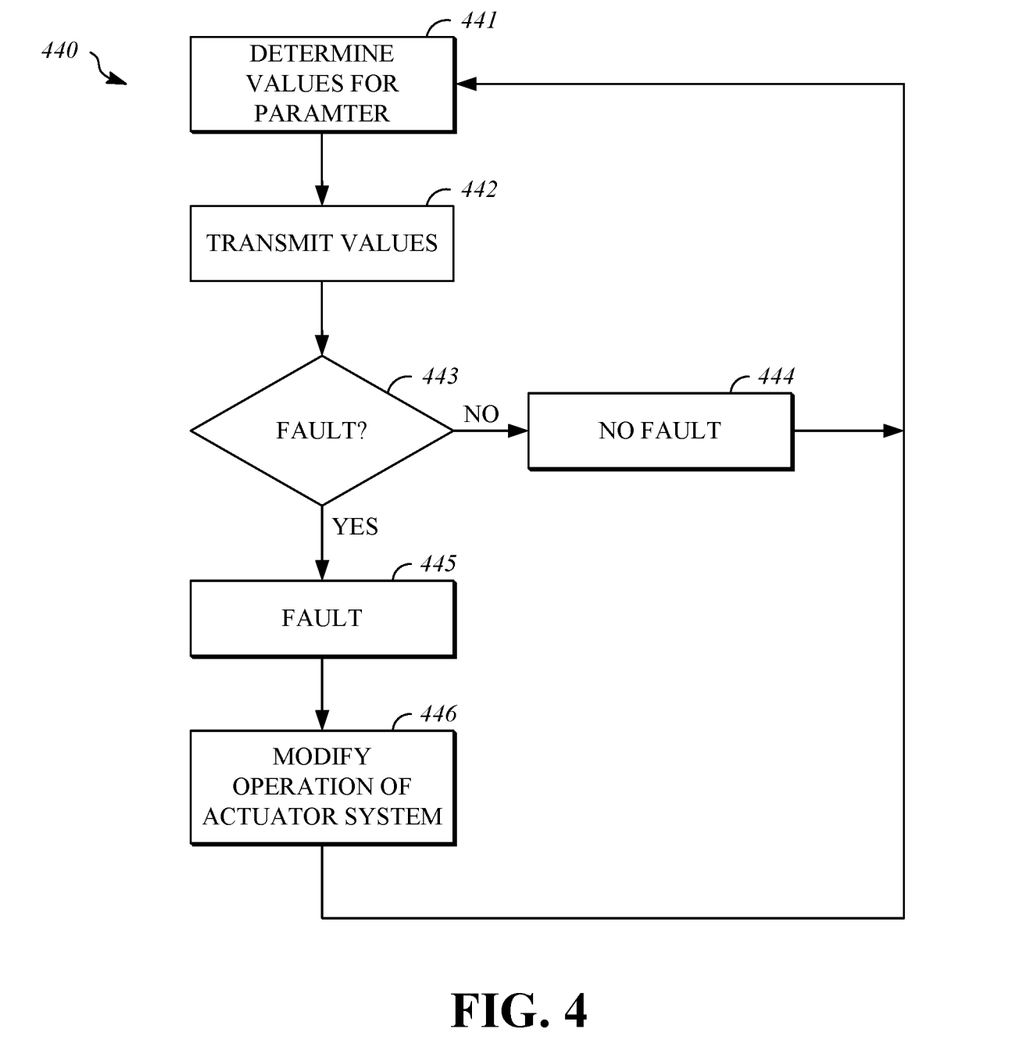
FIG. 4 is a flowchart showing an actuator control process according to a second example.

FIG. 4 is a flowchart that shows an actuator control process 440 according to a second example. The actuator control process 440 may be implemented using the vehicle actuator system 218. As an example, the actuator control process 440 may be implemented in part by software executed by some or all of the components of the vehicle actuator system 218.

In operation 441, three or more components from the vehicle actuator system 218 determine values for at least a first parameter. The values may be or include, for example, one or more values describing the state of the actuator 226, and/or one or more values describe one or more commands to be sent to the actuator 226. As an example, in some embodiments, each of the supervisor 220, the primary actuator controller 222, and the secondary actuator controller 224 each determine values for one or more parameters.

In operation 442, the values that were determined in operation 441 are reported from the components that determined the value to at least one other component. Thus, in operation 442, some or all of the components of the vehicle actuator system 218 may each transmit information to one or more other components of the vehicle actuator system 218. As an example, the supervisor 220, the primary actuator controller 222, and the secondary actuator controller 224 each report the values determined in operation 441 to one or more other components of the vehicle actuator system 218. In some embodiments, each component that determined a value at operation 441 receives values from all of the other components that determined values at operation 441. As an example, the supervisor 220 transmits the values determined in operation 441 to the primary actuator controller 222 and the secondary actuator controller 224, the primary actuator controller 222 transmits the values determined in operation 441 to the supervisor 220 and the secondary actuator controller 224, and the secondary actuator controller 224 transmits the values determined in operation 441 to the supervisor 220 and the primary actuator controller 222.

In operation 443, the values that were transmitted in operation 442 are utilized to determine whether a fault may be present at one or more components. As an example, operation 443 may be performed by one of more of the supervisor 220, the primary actuator controller 222, and the secondary actuator controller 224. Operation 443 may include determining whether all of the values determined by the components for a specific parameter agree, such as by differing from one another by less than a threshold value.

In some embodiments, if all of the values for a single parameter agree, then it may be determined that no fault is present at operation 444, and the process returns to operation 441. If no fault is present, operation of the vehicle actuator system 218 may continue without modification. In some embodiments, if all of the values reported for a single parameter do not agree, then it is determined that a fault may be present at operation 445, and the process continues to operation 446.

In some embodiments, the values that were transmitted at operation 442 may also be used to understand the location of the fault. For example, in the vehicle actuator system 218, if the values reported by the supervisor 220 and the secondary actuator controller 224 agree with each other but not with the value reported by the primary actuator controller 222, it may be determined that the fault is located at the primary actuator controller 222. If the values reported by the supervisor 220 and the primary actuator controller 222 agree with each other but not with the value reported by the secondary actuator controller 224, it may be determined that the fault is located at the secondary actuator controller 224. If the values reported by the primary actuator controller 222 and the secondary actuator controller 224 agree with each other but not with the value reported by the supervisor 220, it may be determined that the fault is located at the supervisor 220. This manner of determining the fault location may be applied to systems that have different numbers of components that are calculating values for the same parameter. For example, assuming a number n of devices determine values for the one or more parameters in operation 441, agreement as to the value for the parameter by n-1 devices may be used as a basis for determining that a fault exists at the location of the component that produced the value that does not agree with the other values.

In some embodiments, the location of the fault may be identified by determining whether all but one of the values produced by the components for the parameter are in agreement, in which case it is determined that the component that produced the inconsistent value has a fault. In other embodiments, the location of the fault may be identified by determining whether at least two of the values produced by the components for the parameter are in agreement, in which case it is determined that the at least two components that produced the consistent values do not have faults.

At operation 446, control of the actuator 226 may be modified in response to the determination, at operation 445, that a fault may be present. As an example, the responsibility for control of the actuator 226 may be changed from a first actuator controller, such as the primary actuator controller 222, to a second actuator controller, such as the secondary actuator controller 224.

In some embodiments, a determination is made as to whether control of the actuator 226 should be changed from the actuator controller that is currently responsible for control of the actuator 226 to a different actuator controller based on the location of the fault and based on which actuator controller is currently responsible for control of the actuator 226. For example, if the primary actuator controller 222 is currently responsible for control of the actuator 226, the determination made at operation 446 may determine whether to change responsibility for control of the actuator to the secondary actuator controller 224. In this example, if the values produced by the other components agree and indicate that the fault is located at the primary actuator controller 222, the primary actuator controller 222 may be deactivated such that it is no longer responsible for control of the actuator 226, and the secondary actuator controller 224 may be activated such that it is now responsible for control of the actuator 226.

In the vehicle actuator system 218, agreement by two of the supervisor 220, the primary actuator controller 222, and the secondary actuator controller 224 may be one condition for determining whether control of the actuator 226 will be changed to a different actuator controller, such as by switching control of the actuator 226 from the primary actuator controller 222 to the secondary actuator controller 224.

In some embodiments, an actuator controller such as the primary actuator controller 222 or the secondary actuator controller 224 may switch itself from the activated state to the deactivated state in response to a determination made by the actuator controller itself. For example, the primary actuator controller 222 may determine that it has encountered a fault. In response, the primary actuator controller 222 may switch itself from the activated state to the deactivated state. The primary actuator controller 222 may, concurrently with switching itself from the activated state to the deactivated state, transmit a message to a different component, such as the secondary actuator controller 224, which causes the secondary actuator controller 224 to switch from the deactivated state to the activated state in order to take over responsibility for controlling operation of the actuator 226.

In some embodiments, an actuator controller such as the primary actuator controller 222 or the secondary actuator controller 224 may switch from the activated state to the deactivated state in response to a command. For example, the supervisor 220 may determine that the primary actuator controller 222 has encountered a fault, and the supervisor 220 may transmit a command from to the primary actuator controller 222. The command transmitted from the supervisor 220 to the primary actuator controller 222 may be configured to cause the primary actuator controller 222 to switch from the activated mode to the deactivated mode. In response to receiving the command from the supervisor 220, the primary actuator controller 222 may switch itself from the activated state to the deactivated state. The supervisor 220 may transmit a similar command to a different actuator controller, such as the secondary actuator controller 224, to cause the secondary actuator controller 224 to switch from the deactivated state to the activated state in order to take over responsibility for controlling operation of the actuator 226.

In some embodiments, an actuator controller such as the primary actuator controller 222 or the secondary actuator controller 224 may be switched from the activated state to the deactivated state by another component, such as the supervisor 220, without action by the actuator controller itself. As one example, the supervisor 220 may terminate supply of power and/or data to the primary actuator controller 222. As another example, the supervisor 220 may block transmission of commands from the primary actuator controller 222. As another example, in implementations where there is physical control of the actuator 226 by the primary actuator controller 222, the supervisor may cause the physical connection between the primary actuator controller 222 to be disconnected, blocked, locked, or otherwise rendered inoperable.

Subsequent to modification of operation of the actuator 226 at operation 446, the process may return to operation 441.

Figure 5:
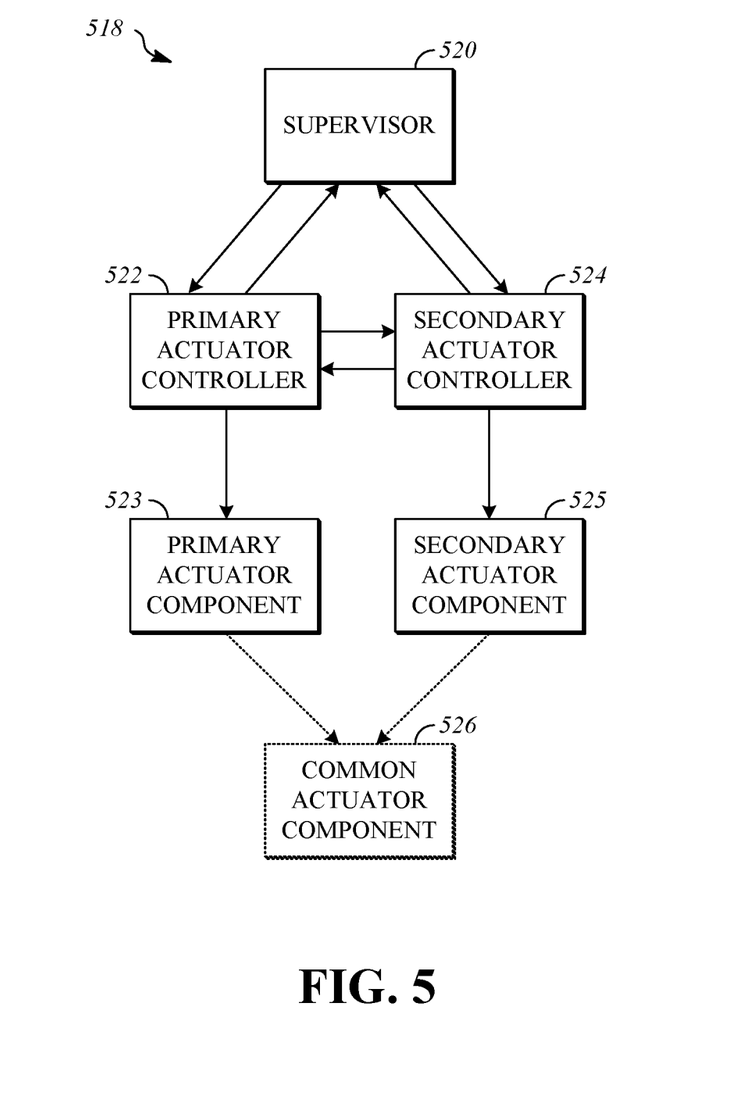
FIG. 5 is an illustration showing a vehicle actuator system.

FIG. 5 is an illustration showing a vehicle actuator system 518, which is similar to the vehicle actuator system 218 expect as noted herein. The vehicle actuator system 518 includes a supervisor 520, a primary actuator controller 522, a primary actuator component 523, a secondary actuator controller 524, a secondary actuator component 525, and an actuator 526. The vehicle actuator system 518 may be incorporated in the vehicle 100 for controlling, for example, the suspension components 106, the steering components 108, the braking components 110, or the propulsion components 112.

The supervisor 520, the primary actuator controller 522 and the secondary actuator controller 524 are operable to determine values for one or more parameters that relate to operation of the actuator 526, as described with respect to the supervisor 220, the primary actuator controller 222, and the secondary actuator controller 224. The primary actuator controller 522 and the secondary actuator controller 524 may be switched between activated and deactivated states, for example, as described with respect to the actuator control process 440.

The primary actuator component 523 and the secondary actuator component 525 are electromechanical components that may be controlled by commands, such as in the form of signals and/or data. The primary actuator component 523 is controlled by commands received from the primary actuator controller 522, and the secondary actuator component 525 is controlled by commands received from the secondary actuator controller 524. The primary actuator component 523 and the secondary actuator component may be activated and deactivated with the primary actuator controller 522 and the secondary actuator controller 524. Thus, when the primary actuator controller 522 is activated, the primary actuator controller 522 and the primary actuator component 523 are utilized to control operation of the actuator 526, and when the secondary actuator controller 524 is activated, the secondary actuator controller 524 and the secondary actuator component 525 are utilized to control operation of the actuator 526.

The primary actuator component 523 and the secondary actuator component 525 are able to exercise control over the actuator 526 by a physical connection. As examples, the physical connection may be a linkage or a pressurized fluid line. The physical connections of the primary actuator component 523 and the secondary actuator component 525 with respect to the actuator 526 may be separated connections or may be a shared connection. In an example where the vehicle actuator system 518 is a friction braking system, the primary actuator component 523 and the secondary actuator component 525 may be pressure-generating components, such as a linear actuator or a pump, that supply fluid pressure to the actuator 526, which in this example may be a fluid-pressure operated piston that controls motion of a friction braking pad or similar component, with the separate or shared pressurized fluid lines connecting the primary actuator component 523 and the secondary actuator component 525 with respect to the actuator 526.

Figure 6:
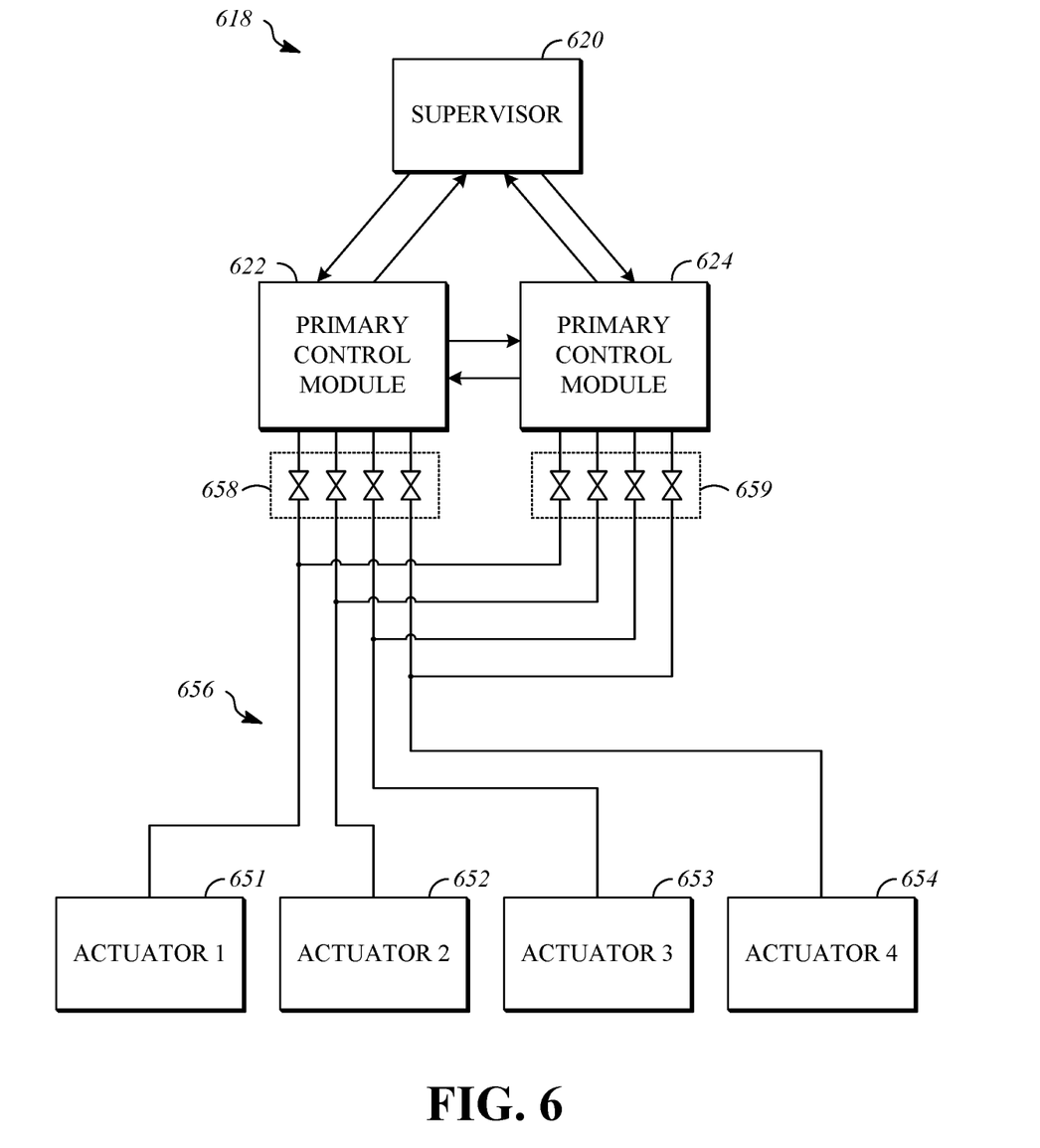
FIG. 6 is an illustration showing a braking system.

FIG. 6 is an illustration showing a braking system 618 that includes a supervisor 620, a primary brake control module 622, a secondary brake control module 624, braking actuators 651, 652, 653, 654, and pressurized fluid lines 656 (i.e., brake lines) that deliver pressurized fluid from the primary brake control module 622 and/or the secondary brake control module 624 in order to cause operation of the braking actuators, 651, 652, 653, 654, which may be fluid pressure operated pistons that cause engagement of friction braking components, such as brake pads and rotors, to cause deceleration of one or more road wheels of a vehicle, such as the road wheels 104 of the vehicle 100. The braking system 618 is similar to the vehicle actuator system 518 except as described otherwise herein.

The primary brake control module 622 and the secondary brake control module 624 are electromechanical components that include a computing device and a pressure-generating component, with the computing device being configured to regulate operation of the pressure-generating component in response to, for example, commands received from the supervisor 620. The pressure generating components of the primary brake control module 622 and the secondary brake control module 624 may be, for example, a linear actuator the extends and retracts a piston within a fluid filled cylinder, or a pump.

The primary brake control module 622 and the secondary brake control module 624 are connected to the braking actuators 651, 652, 653, 654 in a parallel configuration. In the embodiment shown in FIG. 6, the primary brake control module 622 and the secondary brake control module 624 are each connected to the pressurized fluid lines 656 in order to supply pressurized fluid independently to each of the braking actuators 651, 652, 653, 654. In other embodiments, the primary brake control module 622 and the secondary brake control module 624 may each be connected to the braking actuators 651, 652, 653, 654 by separate pressurized fluid lines. The pressurized fluid may be supplied from a fluid source such as reservoir, which may be a single reservoir that is shared by the primary brake control module 622 and the secondary brake control module 624, or may be separate reservoirs that are each associated with a respective one of the primary brake control module 622 and the secondary brake control module 624.

The supervisor 620, the primary brake control module 622 and the secondary brake control module 624 are operable to determine values for one or more parameters that relate to operation of the braking actuators, as described with respect to the supervisor 220, the primary actuator controller 222, and the secondary actuator controller 224. The primary brake control module 622 and the secondary brake control module 624 may be switched between activated and deactivated states, for example, as described with respect to the actuator control process 440.

The supervisor 620 may control the primary brake control module 622 and/or the secondary brake control module 624 by transmitting commands that request a specific braking pressure for each of the braking actuators 651, 652, 653, and 654. The braking pressures requested by the supervisor 620 may be determined based on control inputs, commands, and/or sensor information provided by one or more other systems, and the supervisor 620 may function to arbitrate the commands and determine which will be executed.

The primary brake control module 622 and the secondary brake control module 624 may each be connected to the pressurized fluid lines 656 by valves 658, 659. The valves 658, 659 may be normally-closed valves, meaning that the valves 658, 659 are in a closed position in the absence of power and/or commands that cause the valves 658, 659 to move from the closed position to an open position. As a result, the valves 658 of the primary brake control module 622 will be closed when the primary brake control module 622 is in the deactivated state, and the valves 659 for the secondary brake control module 624 will be closed when the secondary brake control module 624 is in the deactivated state. In the activated states, the primary brake control module 622 and the secondary brake control module 624 may modulate opening and closing of the valves 658, 659 to cause desired operation of the brake actuators 651, 652, 653, 654.

In some embodiments, determination of whether a fault is present at the primary brake control module 622 or the secondary brake control module 624 may be performed by determining that performance of one or more of the brake actuators 651, 652, 653, 654 does not match expected performance, as described with respect to the actuator control process 330. In such embodiments, deviation of actuator performance from expected performance may be identified by the actuator controller that is responsible from regulating operation of the brake actuators 651, 652, 652, 654, or by another component of the braking system 618.

In some embodiments, determination of whether a fault is present at one or more of the supervisor 620, the primary brake control module 622, and the secondary brake control module 624 may be performed as by determining that values calculated by two or more components do not agree, as described with respect to the actuator control process 440. In some embodiments, a fault may be detected based on performance information as described with respect to the actuator control process 330.

In some embodiments, a hydraulic leak can be determined by comparing expected brake pressure values to measured brake pressure values. The expected brake pressure values are determined by the responsible actuator controller, such as the primary brake control module 622. The expected brake pressure values are utilized to control the braking actuators 651, 652, 653, 654 and are also transmitted to other components of the braking system 618. Each of the components of the braking system 618 may also receive actual brake pressure values from the sensors 116, which may include pressure-sensing components that are associated with each of the braking actuators 651, 652, 653, 654.

In response to identifying a hydraulic leak, the valves 658 or the valves 659 may be closed, as appropriate, as part of deactivation of the primary brake control module 622 or the secondary brake control module 624. In embodiments where the primary brake control module 622 and the secondary brake control module 624 are connected to the braking actuators 651, 652, 653, 654 by separate pressurized fluid lines, control may be switched, such as from the primary brake control module 622 to the secondary brake control module 624. In embodiments where the primary brake control module 622 and the secondary brake control module 624 share the pressurized fluid lines 656, responsibility for braking may be switched to a different actuator system, such as to the propulsion components 112 of the vehicle 100.

What is claimed is:

1. A vehicle actuator system of a vehicle, comprising:
    a common actuator component that is configured to affect motion of the vehicle;
    a first actuator component that is operated by an actuator command, wherein the first actuator component controls the common actuator component in a first control state of the vehicle actuator system;
    a second actuator component that is operated by the actuator command, wherein the second actuator component controls the common actuator component in a second control state of the vehicle actuator system;
    a first actuator controller that determines a first command value;
    a second actuator controller that determines a second command value; and
    a supervisor that determines a third command value,
        wherein the vehicle actuator system changes from the first control state to the second control state in response to identification of a fault of the vehicle actuator system based on a comparison of the first command value, the second command value, and the third command value,
        wherein the first actuator controller sends the first command value to the first actuator component as the actuator command in the first control state and thereby operates the common actuator component by the first actuator component, and
        wherein the second actuator controller sends the second command value to the second actuator component as the actuator command in the second control state and thereby operates the common actuator component by the second actuator component.

2. The vehicle actuator system of claim 1, wherein the fault of the vehicle actuator system is identified by at least one of the first actuator controller, the second actuator controller, or the supervisor when the first command value differs from the second command value by more than a threshold value and the second command value does not differ from the third command value by more than the threshold value.

3. The vehicle actuator system of claim 2, wherein the first command value and the second command value differ from the third command value by less than the threshold value when no fault of the vehicle actuator system is present.

4. The vehicle actuator system of claim 1, wherein the second actuator component does not control the common actuator component in the first control state and the first actuator component does not control the common actuator component in the second control state.

5. The vehicle actuator system of claim 1, wherein the first command value, the second command value, and the third command value are determined according to a desired output of the common actuator component.

6. The vehicle actuator system of claim 5, wherein the desired output of the common actuator component is a desired steering angle.

7. The vehicle actuator system of claim 5, wherein the desired output of the common actuator component is a desired braking force.

8. A vehicle actuator control method for controlling a vehicle actuator system, comprising:
determining, by a first actuator controller, a first command value;
determining, by a second actuator controller, a second command value;
determining, by a supervisor, a third command value;
determining whether the first command value differs from the second command value and the third command value by more than a threshold value; and
controlling a common actuator component using one of a first actuator component or a second actuator component,
wherein the common actuator component is controlled by the first actuator component according to the first command value when it is determined that the first command value does not differ from the second command value and the third command value by more than the threshold value, and
wherein the common actuator component is controlled by the second actuator component according to the second command value when it is determined that the first command value differs from the second command value and the third command value by more than the threshold value.

9. The vehicle actuator control method of claim 8, wherein the first actuator component and the second actuator component are each physically connected to the common actuator component in a manner that allows each of the first actuator component and the second actuator component to exercise control over the common actuator component.

10. The vehicle actuator control method of claim 9, wherein the first actuator component and the second actuator component are physically connected to the common actuator component by one or more linkages.

11. The vehicle actuator control method of claim 9, wherein the first actuator component and the second actuator component are physically connected to the common actuator component by one or more fluid lines.

12. The vehicle actuator control method of claim 8, further comprising:
switching the first actuator controller from an activated mode of the first actuator controller to a deactivated mode of the first actuator controller when it is determined that the first command value differs from the second command value and the third command value by more than the threshold value.

13. The vehicle actuator control method of claim 12, wherein:
in the activated mode of the first actuator controller, the first actuator component controls the common actuator component, and in the deactivated mode of the first actuator controller, the first actuator component does not control the common actuator component.

14. The vehicle actuator control method of claim 8, further comprising:
switching the second actuator controller from a deactivated mode of the second actuator controller to an activated mode of the second actuator controller when it is determined that the first command value differs from the second command value and the third command value by more than the threshold value.

15. The vehicle actuator control method of claim 14, wherein:
in the activated mode of the second actuator controller, the second actuator component controls the common actuator component, and
in the deactivated mode of the second actuator controller, the second actuator component does not control the common actuator component.

16. A vehicle actuator system of a vehicle, comprising:
a common actuator component that is configured to affect motion of the vehicle;
a first actuator component that is operated by an actuator command, wherein the first actuator component controls the common actuator component in a first control state of the vehicle actuator system;
a second actuator component that is operated by the actuator command, wherein the second actuator component controls the common actuator component in a second control state of the vehicle actuator system;
a first actuator controller that determines a first command value and transmits the first command value to the first actuator component as the actuator command and thereby controls the common actuator component by the first actuator component when the vehicle actuator system is in the first control state;
a second actuator controller that determines a second command value and transmits the second command value to the second actuator component as the actuator command and thereby controls the common actuator component by the second actuator component when the vehicle actuator system is in the second control state; and
a supervisor that determines a third command value and determines whether to operate the vehicle actuator system in the first control state or the second control state based on the first command value, the second command value, and the third command value.

17. The vehicle actuator system of claim 16, wherein the supervisor operates the vehicle actuator system in the first control state when the first command value does not differ from at least one of the second command value or the third command value by more than a threshold value.

18. The vehicle actuator system of claim 16, wherein the supervisor operates the vehicle actuator system in the second control state when the first command value differs from the second command value by more than a threshold value and the second command value does not differ from the third command value by more than the threshold value.

19. The vehicle actuator system of claim 16, wherein the first actuator controller is in control of the common actuator component in the first control state and the second actuator controller is in control of the common actuator component in the second control state.

20. The vehicle actuator system of claim 16, wherein the first actuator controller is not in control of the common actuator component in the second control state and the second actuator controller is not in control of the common actuator component in the first control state.

\* \* \* \* \*